United States Patent [19]

Kraft

[11] 4,361,220
[45] Nov. 30, 1982

[54] DRIVE CHAIN

[75] Inventor: Joseph K. Kraft, Parsippany, N.J.

[73] Assignee: Westinghouse Electric Corp., Pittsburgh, Pa.

[21] Appl. No.: 238,261

[22] Filed: Feb. 25, 1981

[51] Int. Cl.³ .......................... B65G 9/12; B65G 23/14
[52] U.S. Cl. .................................... 198/330; 198/833; 474/231
[58] Field of Search ................. 198/833, 330; 474/231

[56] References Cited

U.S. PATENT DOCUMENTS

| | | |
|---|---|---|
| 2,158,622 | 5/1939 | Festenberg . |
| 2,770,144 | 11/1956 | Bendall . |
| 2,816,453 | 12/1957 | Frank . |
| 2,934,120 | 5/1961 | Hurry . |
| 3,071,981 | 1/1963 | Kuntzmann . |
| 3,167,935 | 2/1965 | Fawick . |
| 3,677,388 | 7/1972 | Boltrek . |
| 3,880,014 | 4/1975 | Bendall . |
| 4,114,467 | 9/1978 | Peterchack . |
| 4,123,947 | 11/1978 | Smith . |

Primary Examiner—John J. Love
Assistant Examiner—Brian Bond
Attorney, Agent, or Firm—D. R. Lackey

[57] ABSTRACT

A multiple strand drive chain for transmitting power from toothed sprockets to an endless belt constructed of toothed links. The strand which cooperates with the toothed links has a plurality of spaced rollers, with alternate rollers, which have a first predetermined diameter, being constructed of a deformable, resilient material. The intervening rollers, which have a smaller diameter than the first predetermined diameter, are constructed of a substantially non-deformable, rigid material. The deformable rollers normally share the driving load in a substantially uniform manner, but as the chain wears the sharing becomes disproportionate. The non-deformable rollers greatly extend chain life by limiting the maximum driving load placed on any one deformable roller.

7 Claims, 6 Drawing Figures

DRIVE CHAIN

BACKGROUND OF THE INVENTION

1. Field of the Invention:

The invention relates in general to drive chains, and more specifically to multiple strand roller drive chains for transmitting power from toothed sprockets to an endless belt constructed of toothed links.

2. Description of the Prior Art:

U.S. Pat. No. 3,677,388, which is assigned to the same assignee as the present application, discloses a new and improved drive arrangement for an escalator in which a modular drive unit drives a pair of sprockets. Multiple strand drive chains link the driven sprockets with idler sprockets. An endless belt is driven by drive chains. Each side of the endless belt is constructed of interconnected toothed links. The two sides are interconnected via step axles, to which the escalator steps are attached. The toothed links on each side of the belt engage a driving strand of each multiple strand drive chain, to cause the endless belt to be driven in a loop. Each driving strand includes a plurality of spaced rollers constructed of a resilient material, such as polyurethane. The resilient rollers distribute the load more uniformly between the rollers which are in engagement with the teeth of the toothed links, than rigid rollers. While the load is substantially uniformly distributed between a plurality of rollers when the drive chain is new, the sharing of load becomes increasingly disproportionate as the chain wears. This shortens the useful operating life of the chain because of premature failure of the resilient rollers.

SUMMARY OF THE INVENTION

Briefly, the present invention is a new and improved multiple strand roller drive chain suitable for use in transmitting power from driven sprockets to an endless belt constructed of a plurality of interconnected, rigid toothed links. Instead of constructing all of the rollers of the strands which engage the teeth of toothed links of deformable, resilient material, such as polyurethane, only the alternate rollers are of this construction. The intervening or remaining rollers of each drive strand are constructed of a rigid, substantially nondeformable material, such as steel. Further, instead of all the rollers of each drive strand having the same diameter, the rigid rollers are constructed with a diameter which is less than the diameter of the resilient rollers. The loading of the resilient rollers is limited to a predetermined maximum value by translating the deformation of the resilient material which will cause this maximum desired loading into the required dimensional difference between the diameters of the deformable and non-deformable rollers. For example, if the maximum desired force on each resilient roller is 400 pounds when the drive chain is worn 0.006 inch per 1 inch of pitch, and a force of 400 pounds causes a deformation of 0.042 inch, the difference X in radii is given by the following relationship when the roller pitch of the drive strand is 2 inches:

$$2(0.006) + X = 0.042$$

Thus, the difference in radii is 0.030 inch, and the difference in outside diameters is thus 0.060 inch. Once a resilient roller has been deformed by a dimension of 0.042 inch, the immediately following rigid roller will absorb any additional driving force which would have been applied to this resilient roller, limiting the force on the resilient roller to the desired maximum value.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENT

Figure 1:
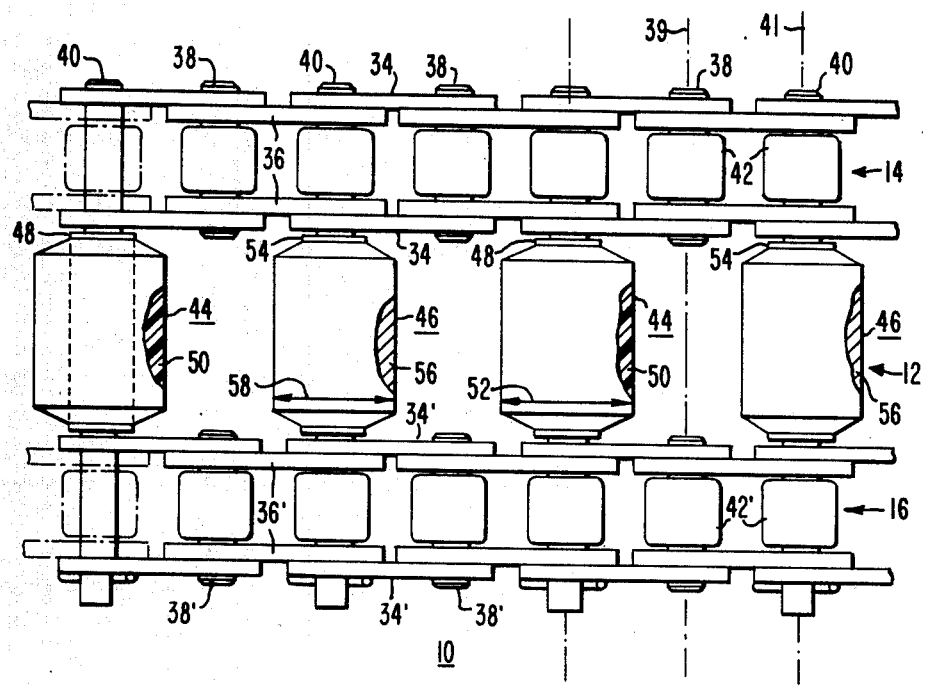
FIG. 1 is a fragmentary plan view of a multiple strand roller drive chain constructed according to the teachings of the invention.
Figure 2:
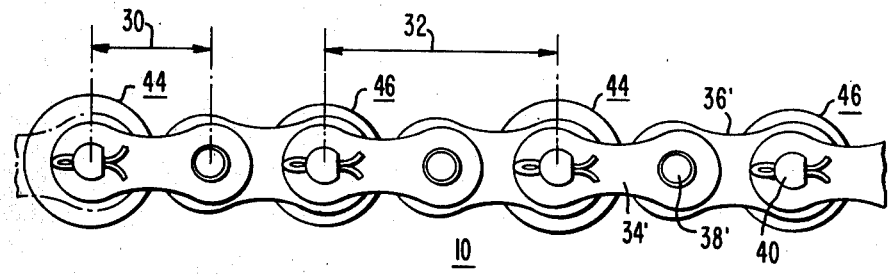
FIG. 2 is a side view of the drive chain shown in FIG. 1.

Referring now to the drawings, and to FIGS. 1 and 2 in particular, there is shown a multiple strand roller drive chain constructed according to the teachings of the invention. FIG. 1 is a plan view of a section of the drive chain 10, which chain is formed in an endless loop, and FIG. 2 is an edge or side view of the drive chain. For purposes of example, drive chain 10 is constructed generally as shown in U.S. Pat. No. 3,677,388, and this patent is hereby incorporated into the present application by reference, in order to simplify and condense the description of the usage of the drive chain 10 in the intended escalator application. Drive chain 10 has three strands in the preferred embodiment, a central or inner strand 12, and first and second outer or side strands 14 and 16, respectively. The outer strands 14 and 16 are driven by a sprocket arrangement, which is fully described in the incorporated patent, and which is shown generally at 18 in FIG. 3. The inner strand 12 drives an endless belt constructed of interconnected rigid, metallic toothed links, also fully described in the incorporated patent, and shown generally at 20 in FIG. 3.

Figure 3:
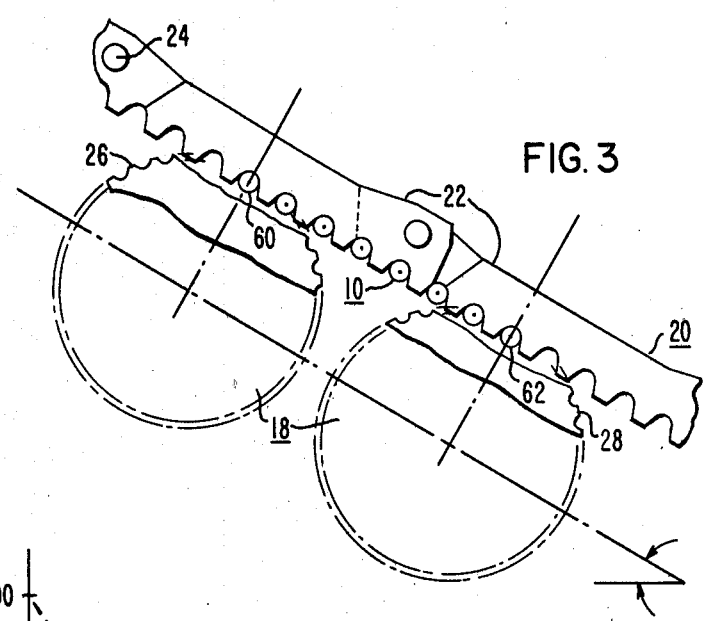
FIG. 3 illustrates a portion of a drive coupling which illustrates the usage of the drive chain shown in FIGS. 1 and 2, wherein two strands of each drive chain are driven by sprockets, and the remaining strand of each drive chain drives an endless belt constructed of interconnected toothed links.

The endless belt 20 shown in FIG. 3 is formed of interconnected toothed links 22 on each of its sides, with the two sides being connected together via step axles 24, which also pivotally interconnect the rigid toothed links on each side. The escalator steps are attached to the step axles 24.

The drive sprocket arrangement 18 shown in FIG. 3 includes a driven sprocket 26, driven by a modular drive unit described in the incorporated patent, and an idler sprocket 28, on each side of the sprocket arrangement 18, with each side of the sprocket arrangement 18 having a drive chain 10 which loops about the driven and idler sprockets. The driven and idler sprockets each have first and second spaced rows of teeth which mesh with the first and second outer strands 14 and 16, respectively, of the drive chain.

Returning now to FIGS. 1 and 2, the pitch of the inner strand 12 is twice the pitch of the side strands 14 and 16. Thus, if the pitch 30 of the side strands 14 and 16 is 1.0 inch, the pitch 32 of the inner strand 12 is 2.0 inches. Outer strand 14 is constructed of interlocking metallic pin links 34 and bushing links 36, metallic pins 38, which are associated only with strand 14, and metallic pins 40 which extend through all three strands. The longitudinal axes 39 and 41 of pins 38 and 40, respectively, are disposed in spaced, parallel relation. Metallic roller sleeves 42 are mounted for rotation on pins 38 and 40. In like manner, outer strand 16 is constructed of interlocking metallic pin links 34' and bushing links 36', metallic pins 38', which are associated only with strand 16, and pins 40. Metallic roller sleeves 42' are mounted for rotation on pins 38' and 40. The inner strand 12 is formed by disposing roller assemblies on pins 40, between bushing links 34 and 34', with every other roller, or alternate roller assemblies 44, being of like construction, and the remaining or intervening roller assemblies 46 being of like construction, with the construction of the roller assemblies 46 being different than the construction of the roller assemblies 44.

More specifically, roller assemblies 44 each include a bushing 48 and a deformable, non-metallic, resilient roller sleeve 50. For example, roller sleeve 50 may be formed of polyurethane having a type A durometer of about 90. Roller sleeves 50 have a first predetermined outside diameter 52.

Roller assemblies 46 each include a bushing 54 and a substantially non-deformable, metallic, rigid roller sleeve 56. They may be separate elements, or they may be one homogeneous part. For example, roller sleeve 56 may be formed of steel. Roller sleeves 56 have a second predetermined outside diameter 58, with the second predetermined outside diameter being less than the first predetermined outside diameter 52 of the resilient roller sleeves 50. The difference between diameters 52 and 58 is selected to provide the maximum desired loading of the resilient sleeves 50, as will be hereinafter explained.

Figure 4:
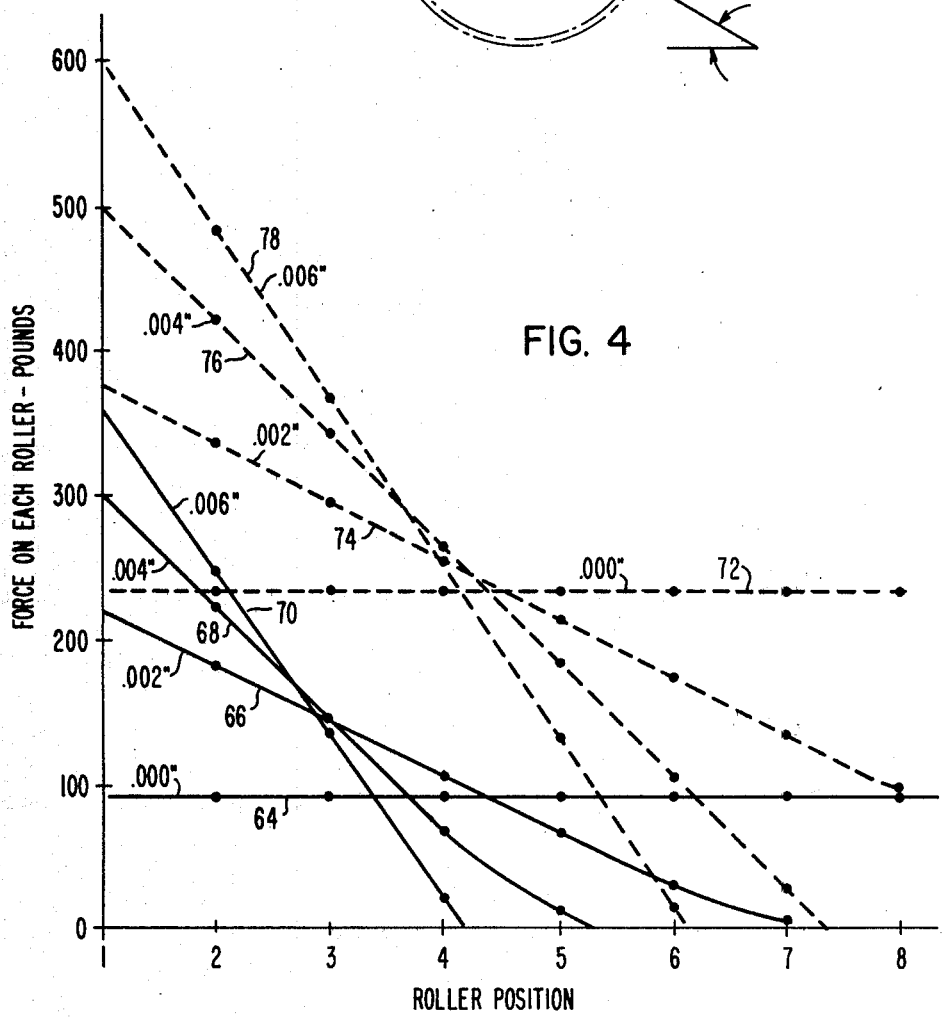
FIG. 4 is a graph which sets forth the force on each roller of the arrangement shown in FIG. 3, for both an unloaded and fully loaded escalator, when the drive chain is constructed according to the teachings of the prior art.

In the prior art drive chain described in the incorporated patent, the roller assemblies of the inner or drive strand 12 are all constructed as described relative to roller assemblies 44. This resilient construction was preferred because of the load sharing aspects of resilient rollers, as well as for lessening noise and vibration. When the drive chain is new and its pitch is the same as the pitch of the teeth on the toothed links, the force on each roller engaged by a link is the same. For purposes of example, assume a 48 inch wide escalator having a 20 foot rise which distributes a total of 750 pounds across the engaged rollers with no passengers, and 1,875 pounds across the engaged rollers with rated passenger load. FIG. 4 is a graph which illustrates the load on each engaged roller for no-load, and for rated load, with various amounts of chain wear per inch of pitch, from zero wear to 0.006 inch wear. The engaged rollers are referenced to the rollers shown in FIG. 3, with roller 60 being roller position number 1 in the graph, and with roller 62 being roller position number 8 in the graph. Curves 64, 66, 68 and 70 illustrate the force distribution over the engaged rollers for 0.000 inch, 0.002 inch, 0.004 inch, and 0.006 inch wear per 1.0 inch pitch for an unloaded escalator, and curves 72, 74, 76 and 78 illustrate the force distribution for similar wear for a fully loaded escalator. It will be noted that curve 72 indicates an equal force of about 230 pounds on each engaged roller, when the chain is new, i.e., wear is 0.000 inch, and that when the wear reaches 0.006 inch per 1.0 inch of pitch, the force distribution is unequal. As illustrated by curve 78, the force on the roller in position 1 is 600 pounds, the force on the roller in position 2 is 480 pounds, the force on the roller in position 3 is 360 pounds, etc., with substantially no force on the rollers in positions 6, 7 and 8. The higher than normal loading on the resilient rollers reduces their useful operating life.

The present invention enables the load on a resilient roller to be limited to a predetermined maximum value by alternating resilient and rigid rollers in the drive strand of the chain, and by providing the rigid rollers with a smaller outside diameter than the resilient rollers. In determining the difference in outside diameters, first the maximum desired load on a resilient roller is selected for achieving the desired chain life. For purposes of example, it will be assumed that this maximum load is 400 pounds. The deformation of the resilient material used for the resilient rollers which corresponds to a load of 400 pound is then determined. Using polyurethane of the aforesaid durometer, a force of 400 pounds causes a deformation of 0.042 inch. Then, the maximum chain wear per drive strand pitch at which it is still desired to maintain the load limit, is determined. For example, if it is desired to operate within the 400 pound maximum load limit when the chain is worn 0.006 inch per 1.0 inch of pitch, the wear per drive strand pitch, which in the example has a 2 inch pitch, would be 0.012 inch. The required difference X in radii between the resilient and rigid rollers is then stated by the following relationship:

$$2(0.006) + X = 0.042$$

Thus, the difference X in radii is equal to 0.030 inch. If the outside diameter of the resilient roller is 1.125 inches, for example, the outside diameter of the rigid roller would be 0.060 inch less, or 1.065 inches.

Figure 5:
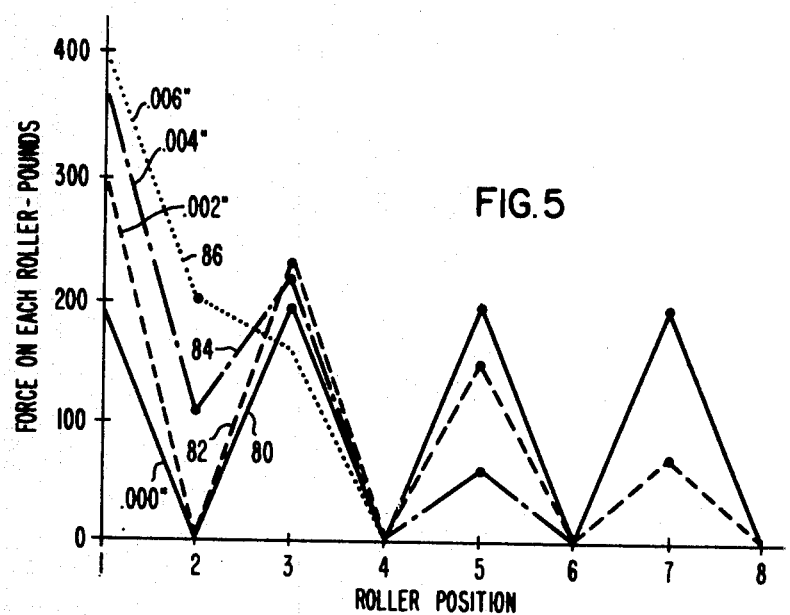
FIG. 5 is a graph which sets forth the force on each roller of the arrangement shown in FIG. 3 for an unloaded escalator, when the drive chain is constructed according to the teachings of the invention.

FIG. 5 is a graph which illustrates the load on each roller of the FIG. 3 configuration, with no passengers on a 48 inch wide, 20 foot rise escalator, using a drive chain constructed according to the teachings of the invention. Curves 80, 82, 84 and 86 illustrate the force distribution for chain wear of 0.000 inch, 0.002 inch, 0.004 inch, and 0.006 inch, respectively, per 1.0 inch pitch. With 0.006 inch wear per 1.0 inch pitch, curve 86 illustrates that the load is taken by the rollers in position 1, 2 and 3, with the roller in position 1, a resilient roller, taking 400 pounds, the rigid roller in position 2 taking 200 pounds, and the resilient roller in position 3 taking 150 pounds.

Figure 6:
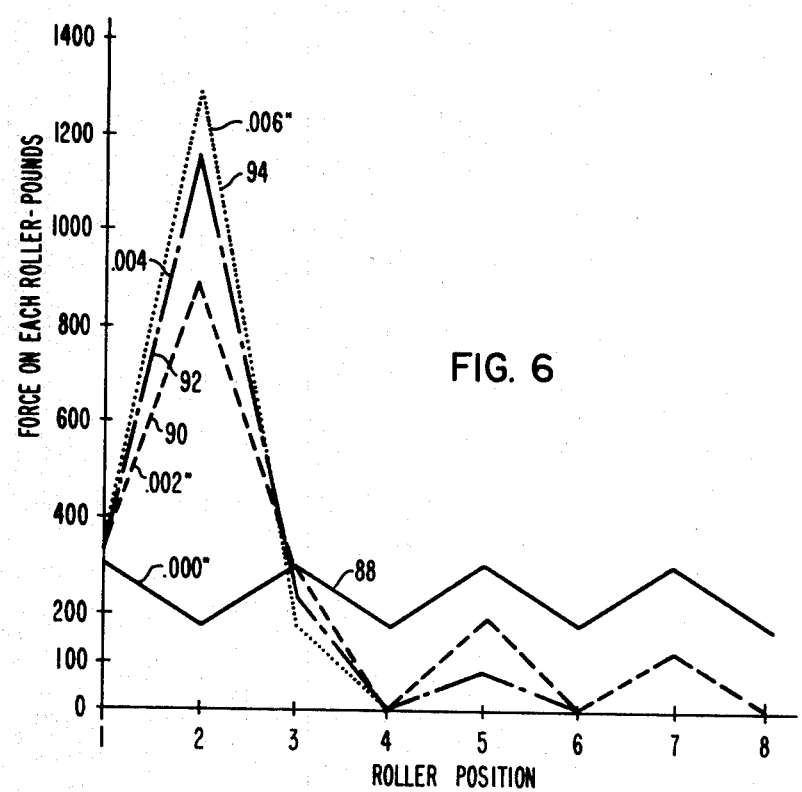
FIG. 6 is a graph which sets forth the force on each roller of the arrangement shown in FIG. 3, for a fully loaded escalator, when the drive chain is constructed according to the teachings of the invention.

FIG. 6 is a graph which illustrates the load on the same escalator used for developing the FIG. 5 graph, except with a full passenger load. Curves 88, 90, 92 and 94 illustrate the force distribution for chain wear of 0.000 inch, 0.002 inch, 0.004 inch, and 0.006 inch, respectively, per 1.0 inch pitch. With 0.006 inch/1.0 inch pitch wear, curve 94 shows that the load is taken by the rollers in positions 1, 2 and 3, with the resilient roller in position 1 taking 400 pounds, the rigid roller in position 2 taking 1,300 pounds, and the resilient roller in position 3 taking 175 pounds.

Thus, in summary, from no-load to full-load on an escalator, up to 0.006 inch wear per 1.0 inch pitch on the drive chain, the force on the resilient rollers of the drive chain is limited to 400 pounds, with the rigid rollers taking any excess. Even when the chain is worn, the resilient rollers will carry the load most of the time, within the 400 pound limit, as the operation of escalators at full load occurs infrequently, and then for relatively short periods of time. Since the major factor in the life expectancy of the drive chain using the prior art drive chain structure is the overloading of the resilient roller, the present invention extends the life expectancy by limiting resilient roller loading.

I claim as my invention:

1. A multiple strand drive chain, comprising:
   at least one driven strand,
   and at least one driving strand,
   said at least one driving strand having a plurality of rollers spaced from one another on parallel axes, with alternate rollers being constructed of a resilient material and the intervening rollers being constructed of a rigid material,
   said alternate and intervening rollers having first and second predetermined different diameters, respectively, with the second predetermined diameter being less than the first predetermined diameter, enabling the load on said driving strand to be distributed over a plurality of alternate rollers, with the maximum load on any one of said alternate rollers being limited to a value responsive to the difference between said first and second predetermined roller diameters.

2. The drive chain of claim 1 wherein the alternate and intervening rollers are constructed of non-metallic and metallic materials, respectively.

3. The drive chain of claim 1 wherein the alternate and intervening rollers are constructed of polyurethane and steel, respectively.

4. The drive chain of claim 1 wherein the second predetermined diameter is about 0.060 inch less than the first predetermined diameter.

5. A multiple strand roller drive chain suitable for transmitting power from toothed sprockets to an endless belt constructed of toothed links, comprising:
   at least one strand for engaging toothed links of the endless belt,
   said at least one strand having a plurality of spaced rollers disposed on parallel axes, with alternate rollers being deformable in response to load, and the intervening rollers being substantially non-deformable,
   said deformable and non-deformable rollers being constructed and arranged such that normally only the deformable rollers contact the teeth of the toothed links, with several being in contact to spread the driving load,
   said non-deformable rollers contacting the teeth only when the deformation of the deformable rollers exceeds a predetermined dimension.

6. The drive chain of claim 5 wherein the non-deformable and deformable rollers are constructed of rigid and resilient materials, respectively.

7. The drive chain of claim 5 wherein the rollers have a predetermined pitch, and wherein the non-deformable rollers have a predetermined diameter which is less than the diameter of the deformable rollers, such that the non-deformable rollers are contacted by link teeth only when the deformation of the deformable rollers is equal to the difference in radii between the deformable and non-deformable rollers plus chain wear per roller pitch, with the dimension being selected to correspond to the maximum desired loading of the deformable rollers.

* * * * *